United States Patent [19]

Marquart

[11] Patent Number: 5,280,671
[45] Date of Patent: Jan. 25, 1994

[54] PROCESS AND DEVICE FOR CLAMPING TOOLS IN A CLAMPING CHUCK

[75] Inventor: Uwe Marquart, Reichenbach, Fed. Rep. of Germany

[73] Assignee: FX Marquart GmbH, Fed. Rep. of Germany

[21] Appl. No.: 925,598

[22] Filed: Aug. 3, 1992

[30] Foreign Application Priority Data

May 12, 1992 [DE] Fed. Rep. of Germany ....... 4215606
May 12, 1992 [DE] Fed. Rep. of Germany ....... 4215607

[51] Int. Cl.⁵ ............................................. B23P 11/02
[52] U.S. Cl. ........................................ 29/447; 29/800; 279/158; 409/234
[58] Field of Search ............... 432/224, 225, 230, 231, 432/253; 29/447, 800; 409/234; 279/158

[56] References Cited

U.S. PATENT DOCUMENTS

| | | | |
|---|---|---|---|
| 3,879,252 | 4/1975 | Vossen | 432/224 |
| 5,178,535 | 1/1993 | Delalle | 432/225 |
| 5,188,775 | 2/1993 | Hornback et al. | 34/105 |
| 5,205,732 | 4/1993 | Kirby | 432/225 |

FOREIGN PATENT DOCUMENTS

3925641  8/1990  Fed. Rep. of Germany ......... B23B 31/117

Primary Examiner—Henry C. Yuen
Attorney, Agent, or Firm—Walter A. Hackler

[57] ABSTRACT

The invention indicates a device and a process for clamping tools in a clamping chuck which possesses a shrinkage segment (14) to receive the tool, with a heating apparatus (26), preferably designed as a gas burner, being associated with the shrinkage segment (14). The tool is clamped in the clamping chuck (20) with a press fit in the shrinkage seat, resulting in especially high clamping force. To prevent local overheating of the clamping chuck (20) and achieve complete insertion of the tool shaft into the thermally expanded shrinkage segment (14) of the clamping chuck (20), a receiving apparatus (40)—by means of which, for clamping purposes, the tool can be elastically pressed in the axial direction against the shrinkage segment (14)—is provided to receive the tool.

24 Claims, 1 Drawing Sheet

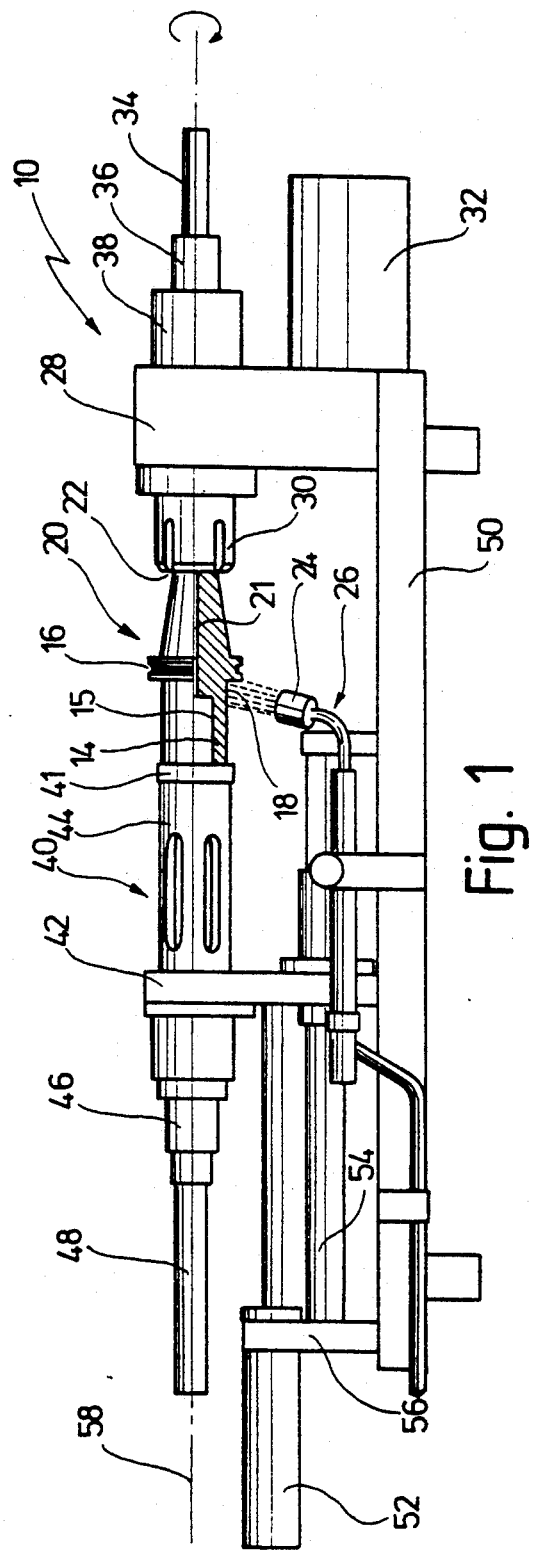
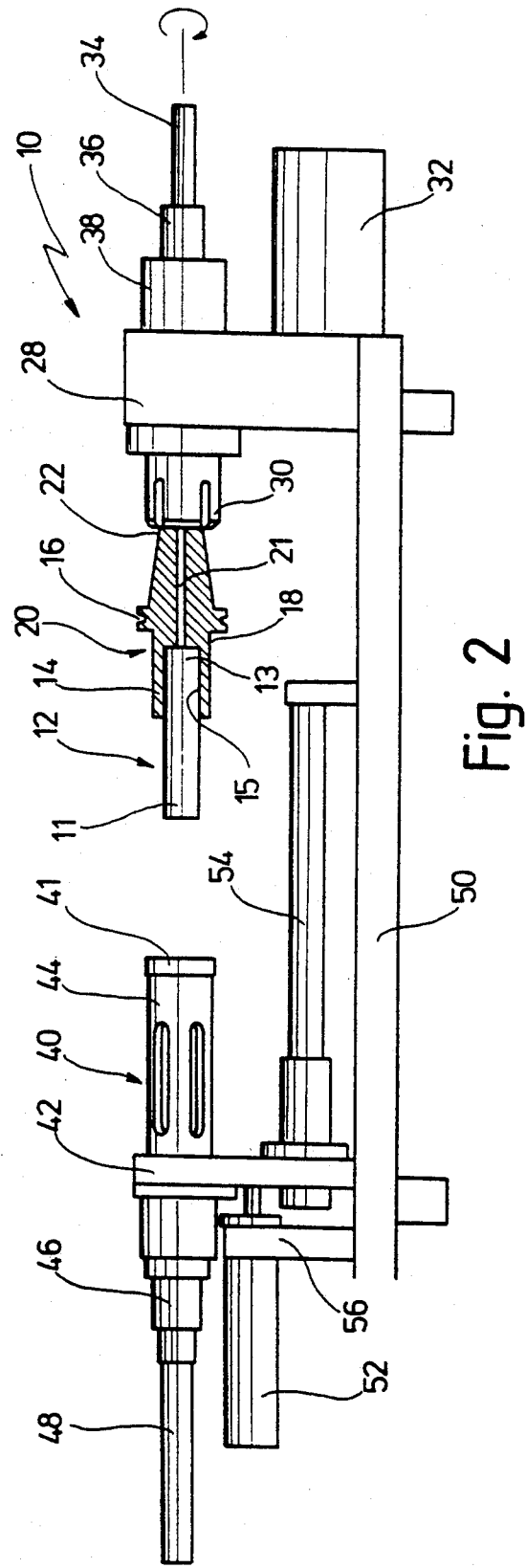

PROCESS AND DEVICE FOR CLAMPING TOOLS IN A CLAMPING CHUCK

BACKGROUND OF THE INVENTION

The invention concerns a device for clamping tools in a clamping chuck that has a shrinkage segment, with a heating apparatus being associated with the shrinkage segment.

The invention further concerns a process for clamping tools in a shrinkage segment of a clamping chuck, in which in order to clamp the tool the shrinkage segment is heated, the tool is introduced into the shrinkage segment that has been enlarged by heating, and after cooling is frictionally retained in the shrinkage segment.

In tools that are retained by means of mechanical clamping elements, especially by means of a collet chuck or a clamping chuck, disadvantages become evident when, as a result of high rotation speeds and/or large tool radii and/or large tool masses, centrifugal forces that counteract the retaining force of the clamping elements occur during operation of the tool. If these centrifugal forces are too great and entirely or partly exceed the retaining forces, the necessary frictional engagement between the spindle receptacle and the tool is no longer guaranteed, with the result that the tool is no longer able to apply the desired machining forces to remove material.

SUMMARY OF THE INVENTION

DE 39 25 641 A1 has disclosed a clamping process and a clamping device in which, to eliminate these disadvantages, the tool is clamped by means of a shrinkage seat into a thermally expanded shrinkage segment of the clamping chuck. For this purpose, the shrinkage segment of the clamping chuck is first heated, then the tool is introduced into the shrinkage segment that has been enlarged by heating, and lastly the segment is cooled off so that the tool is frictionally retained in the receptacle that has shrunk by cooling. The shrinkage segment possesses a conical or cylindrical bore for this purpose, and can be heated by means of a heating apparatus.

Although a considerable improvement in clamping force can theoretically be achieved according to the known process and the known device, it has nevertheless been found that overheating of the clamping chuck during clamping and unclamping can easily occur in this manner, and that complete clamping of the tool shaft is not always ensured.

The underlying object of the invention is therefore to create a device and process for clamping tools whereby the disadvantages of the prior art are eliminated, and whereby especially overheating of the clamping chuck is eliminated.

With regard to the device, this object is achieved by the fact that, in a device of the aforesaid type, a receiving apparatus—by means of which, for clamping purposes, the tool can be elastically pressed in the axial direction against the shrinkage segment of the clamping chuck—is provided to receive the tool.

In accordance with the invention, therefore, the tool is elastically pressed in the receiving apparatus against the shrinkage segment of the clamping chuck, for example by spring force, before the actual clamping procedure. When the shrinkage segment is then heated, the shaft of the tool slides into the shrinkage segment as soon as the latter has heated up sufficiently and thus has expanded sufficiently so that its inside diameter corresponds to the outside diameter of the tool shaft.

The fact that the tool is inserted into the shrinkage segment, in response to the elastic pressure on the tool, as soon as the shrinkage segment of the clamping chuck has expanded sufficiently, on the one hand prevents overheating of the shrinkage segment and on the other hand ensures that the tool shaft is essentially completely accommodated in the clamping segment, thus producing high clamping force.

In a preferred development of the invention, the clamping chuck can be rotationally driven together with the receiving apparatus.

Rotation produces particularly uniform heating of the shrinkage segment, thus preventing local overheating and ensuring uniform expansion for the most complete accommodation possible of the tool shaft in the clamping process.

In a further preferred embodiment of the invention, there is provided a headstock with a clamping apparatus that can be rotationally driven, into which the clamping chuck can be clamped at its end opposite the shrinkage segment, with furthermore a sleeve with a receiving bushing to receive and center the tool being associated with the headstock, and with a first ejector element being provided, which in order to clamp the tool can be braced against the tool head under spring force.

In this manner the clamping chuck can easily be rotationally driven with conventional means, specifically by clamping the clamping chuck at one end into a rotationally driven clamping apparatus, for example a conventional collet chuck, and retaining the tool that is to be clamped in a receiving bushing aligned therewith on a sleeve. The receiving bushing on the one hand ensures centering of the tool, for which purpose suitable counterbores can be present in the receiving bushing. On the other hand, the receiving bushing allows the tool to be received gently, preventing damage to sensitive cutting edges of the tool.

In a further embodiment of the invention, the clamping chuck possesses a central bore for passage of a second ejector element to unclamp the tool.

The advantage of this feature is that with sufficient heating of the shrinkage segment the tool can simply be ejected from the shrinkage segment by means of the ejector element in order to unclamp the tool.

In a further preferred embodiment of the invention, to unclamp the tool the second ejector element can be braced under spring force against the tool shaft.

The result of this is that the tool is ejected by the second ejector element as soon as the clamping segment has heated up sufficiently.

As a result, the tool is quickly and reliably unclamped, and overheating of the clamping segment is reliably prevented during the unclamping process.

In a further embodiment of the invention, the spring force of the second ejector element is greater than the spring force of the first ejector element, and in order to unclamp the tool from the clamping chuck, both ejector elements can be braced against the tool.

This results in particularly gentle ejection of the tool from the clamping chuck, since when the shrinkage segment has heated up sufficiently, the tool is ejected from the shrinkage segment due to the higher spring force of the second ejector element, overcoming the lower spring force of the first ejector element, but during this procedure it is "softly" caught in the receiving sleeve because of the spring force of the first ejector element.

In a further embodiment of the invention, the shrinkage segment of the clamping chuck has a cylindrical bore that ends shortly before a fastening segment of the clamping chuck which serves to fasten the clamping chuck to a machine tool.

It has been found that less heating occurs in the region of the fastening segment, which is generally designed as a fastening flange, because of its greater mass. The feature just mentioned limits heat dissipation by conduction from the clamping segment to the fastening segment of the clamping chuck as it heats up, since only a relatively small cross section is available for thermal conduction. This makes it possible to achieve thermal expansion even at the end of the clamping segment, which is preferably designed as a cylindrical bore, so that the tool shaft can be completely introduced into the clamping segment.

It is theoretically possible to use various kinds of heating apparatus to expand the shrinkage segment. For example, an inductive heating apparatus can be provided. It is proved to be especially advantageous, however, if the heating apparatus is designed as a gas burner, the gas flame of which is directed onto the transition region between the shrinkage segment and the fastening segment on the side of the clamping chuck.

A gas burner, for example a propane gas burner, is characterized by simple design and reliable operation, and allows the shrinkage segment to be expanded in an economical manner without requiring special control apparatus, such as is necessary, for example, with an inductive heating apparatus. In addition, the gas flame can be directed onto the clamping flange so that specific expansion of the clamping flange in the base region of the clamping segment can be achieved. Particularly favorable characteristics are achieved in conjunction with a rotationally driven clamping chuck when the gas flame is directed onto the transition region between the shrinkage segment and fastening segment on the side of the clamping chuck.

As a result, the clamping segment is expanded conically from the tool receiving end towards the base end, ensuring that the tool shaft is inserted completely down to the stop into the clamping segment, under the action of the spring force of the first ejector element, as soon as the opening of the clamping segment at the tool end has heated up sufficiently to allow insertion of the tool shaft into the clamping segment.

In a preferred development of the invention, the gas burner possesses a burner head that is arranged so that the gas flame is directed onto the transition region of the clamping chuck at an angle of approximately 10° to 20°, especially approximately 15°, with respect to the radial direction.

This results in a particularly favorable heat distribution in the transition region of the clamping segment.

It has been found to be especially favorable if, in order to clamp the tool, the clamping chuck rotates at approximately 200 to 500 rpm, especially at approximately 300 to 400 rpm.

Since preferably the clamping chuck is clamped only at one end, the rapid rotation causes cooling of the clamping chuck due to air convection, especially in the region of the clamping chuck that has a larger radius, i.e. especially in the region of the fastening segment, while the shrinkage segment is specifically heated by the gas flame.

In order to clamp the tool, the clamping chuck is heated in the transition region between shrinkage segment and fastening segment to approximately 150° to 250° C. (depending on the size and material of the clamping chuck), especially to approximately 180° to 200° C., until the shrinkage segment has expanded sufficiently at its opening towards the tool so that the shaft of the tool can be inserted into the shrinkage segment.

It has been found that this dimensioning results in a good press fit of the tool in the shrinkage segment, and reliably prevents local overheating of the clamping chuck or the tool shaft. A press fit of this kind can result in clamping forces up to 100% greater than those possible with the use of conventional mechanical clamping chucks.

In a further advantageous embodiment of the invention, the heating apparatus is coupled to a shutoff apparatus, in order to shut off the heating apparatus automatically after ejection [sic] of the tool into the shrinkage segment and/or after ejection of the tool from the shrinkage segment.

The advantage of this feature is that heating of the clamping chuck is reduced to a minimum by the automatic shutoff, thus shortening the overall procedure and eliminating inadvertent continued heating of the clamping chuck after the clamping or unclamping procedure has ended.

In order to allow the necessary axial displacement of the tool during clamping and unclamping, in a preferred development the sleeve is arranged so that it can be moved with respect to the headstock on a guide by means of a pneumatic or hydraulic cylinder.

In this manner, axial displacement of the sleeve can be achieved with particularly simple means.

With regard to the process, the object is achieved, in accordance with the invention, by the fact that in a process of the aforesaid type, for clamping purposes the tool is elastically pressed in the axial direction against the shrinkage segment, while the shrinkage segment is heated until the shrinkage segment has expanded sufficiently so that the tool is pushed into the shrinkage segment under the action of the axial force.

According to the invention, [the tool] is pushed into the shrinkage segment of the clamping chuck by the elastic pressure on the tool in the axial direction, which can be applied for example by spring force, as soon as the shrinkage segment has expanded sufficiently due to heating.

This prevents the clamping chuck from being heated more than absolutely necessary, since the tool is automatically pushed into the shrinkage segment, without further action, as soon as the shrinkage segment has expanded sufficiently. Additional temperature monitoring of the clamping chuck or the shrinkage segment, or temperature control of the heating apparatus, thereby becomes superfluous.

In a preferred embodiment of the process according to the invention, for unclamping purposes elastic pressure is exerted on the tool against its tool shaft in the axial direction while the shrinkage segment is heated, so that the tool is ejected from the shrinkage segment of the clamping chuck under the action of the axial force.

An embodiment of this kind makes it possible, in a corresponding manner, to prevent overheating of the shrinkage segment in the ejection process, since the tool is ejected from the shrinkage segment of the clamping chuck under the action of the axial force as soon as the shrinkage segment has expanded sufficiently due to heating.

A further development of the process according to the invention provides for the clamping chuck and the tool to be rotationally driven together about the long axis during heating.

This allows particularly uniform temperature distribution, and furthermore prevents local overheating on one side.

It is understood that the features mentioned above and those yet to be explained below can be used not only in the respective combination[s] indicated, but also in other combinations or in isolation, without leaving the context of the present invention.

BRIEF DESCRIPTION OF THE DRAWINGS

The invention will be explained further below with reference to a preferred exemplary embodiment that is depicted in the drawings, in which:

FIG. 1 shows a partly sectioned lengthwise view of a device according to the invention with the sleeve extended; and FIG. 2 shows a simplified depiction of the device according to FIG. 1, in which the sleeve is retracted from the tool.

DETAILED DESCRIPTION

In FIGS. 1 and 2, a device according to the invention is designated in its entirety as 10.

Arranged on a base plate 50 is a headstock 28 that is coupled to a drive motor 32 by means of a belt drive, to drive a conventional clamping apparatus 30 in the form of a collet chuck.

Opposite the headstock 28 a sleeve 42 is arranged so it can be displaced in the axial direction 58; the said sleeve is guided in the axial direction on a horizontal guide rod 54, and can be moved in the axial direction 58 by means of a pneumatic cylinder 52 which is fastened to the base plate 50 by means of a vertical upright plate 56.

The clamping apparatus 30 receives a clamping chuck designated in its entirety as 20, into which a tool 12 can be clamped with a shrink fit. The clamping chuck 20 is designed as a tool holder with a standardized clamping taper shank.

The clamping chuck 20 is clamped at its end 22 opposite the tool 12 in the clamping apparatus 20, and immobilized by means of a knurled nut 38.

The clamping chuck 20 possesses a shrinkage segment 14 on the tool side, in which a cylindrical bore 15 is provided to receive the tool shaft 13. Adjoining the shrinkage segment 14 is a fastening segment 16, which possesses a fastening flange and a subsequent clamping taper shaft of conventional configuration. The cylindrical bore 15 of the shrinkage segment 14 ends shortly before the fastening flange of the subsequent fastening segment 16. Passing through the clamping chuck 20 is a central bore 21, through which an ejector element 34 can be passed in order to eject the tool 12 into the clamping chuck 20.

Serving to receive the tool 12 before it is clamped into the clamping chuck 20 and after the unclamping procedure is a receiving apparatus designated in its entirety as 40, which is retained on the sleeve 42. The receiving apparatus 40 comprises a cylindrical retainer 44 for the tool 12 which is centered with respect to the clamping chuck 20 by means of a receiving bushing 41, for which purpose counterbores are provided in the receiving bushing. The receiving bushing 41 is also used to allow insertion of the tool 12 without striking sensitive cutting edges, provided on the tool head, against the retainer 44, which could lead to damage.

A spring-loaded ejector element 48, which can be braced by a soft stop element made of aluminum, by means of a locking bushing 46, against the tool head 11 in order to press the tool 12 elastically towards the clamping chuck 20, can be inserted into the retainer 44.

The second ejector element 34, of corresponding design, is arranged on the opposite side on the headstock 28. It is also spring-loaded and can be braced against the tool shaft 13 by means of a locking bushing 36, through the central opening 21 of the clamping chuck 20.

To heat the clamping chuck 20 so that the tool 12 can be clamped and unclamped, a heating apparatus 26 in the form of a propane gas burner is provided, the burner head 24 of which is aligned so that its gas flame is directed onto the transition region 18 between the shrinkage segment 14 and fastening flange of the fastening region 16; the inclination of the gas flame from the radial is approximately 15°.

The gas flame thus directly strikes the angular transition region 18 at the beginning of the fastening flange, which is additionally roughened, for example by sandblasting, in order to improve heat transfer to the clamping chuck 20 in the transition region 18.

Instead of being roughened, the transition region 18 can also have a corrugated, serrated, toothed, or knurled surface.

The device operates in the following manner:

When a tool 12 is to be clamped into the clamping chuck 20, first the clamping chuck 20 is clamped at its end 22 into the clamping apparatus 30, which is drawn in by means of the knurled nut 38.

With the headstock 28 in the withdrawn position depicted in FIG. 2, the tool head 11 of the tool 12 can now be pushed into the receiving bushing 41, and fastened in the retainer 44. Then the sleeve is moved towards the clamping chuck 20 into the position shown in FIG. 1 until the tool shaft 13 of the tool 12 strikes the outside of the cylindrical bore 15. Then the first ejector element 48 is pressed against the tool head 11 and locked by means of the locking bushing 46, so that the tool shaft 13 is pressed with a spring force of approximately 100 N against the cylindrical opening 15, which is as yet too small.

No force is applied to the second ejector element 34 during this procedure.

The gas burner is then activated in order to heat the shrinkage segment 15. After about 2 to 2.5 minutes the propane gas flame has expanded the shrinkage segment 15 of the clamping chuck 20 so that the shaft 13 of the tool 12 abruptly slides inward, under the action of the spring of the first ejector element 48.

Because the gas flame is directed onto the transition region 18, and because the latter is additionally roughened, the cylindrical bore 15 is more strongly heated at its end towards the spindle head, resulting in a conical expansion of the bore 15. When the tool shaft 13 slides through into the shrinkage segment 14, the tool shaft therefore penetrates completely into the bore 15 until it strikes the end of the bore.

The gas burner is then shut off, either manually or by means of an automatic system (not depicted) that reacts to axial displacement of the tool and thereby shuts off the gas burner.

The receiving apparatus 40 can then be moved to the left on the guide rod 54 by means of the pneumatic cylinder 52, so that the clamping chuck 20, with the tool 12 clamped in the shrinkage seat, can be unclamped from the clamping apparatus 30 for subsequent use in a machine tool.

When the tool 12 is to be removed from the clamping chuck 20, once again the clamping chuck 20 is first clamped at its end 22 into the clamping apparatus 30. Then the receiving apparatus 40 is moved to the right on the guide rod 54 by means of the pneumatic cylinder 52 until the tool head 11 projects through the receiving bushing 41 into the retainer 44.

The second ejector element 34 is then braced, through the central opening 21 of the clamping chuck 20, against the tool shaft 13, and locked by means of the locking bushing 36.

The first ejector element 48 is also braced against the tool head 11, and locked by means of the locking bushing 46.

Since the spring force of the second ejector element 34 (approximately 130 N) is somewhat greater than the spring force of the first ejector element (approximately 100 N), the result is a force component of approximately 30 N attempting to push the tool 12 to the left out of the cylindrical bore 15. As soon as the shrinkage segment 14 has heated up sufficiently after the gas burner has been activated, the tool 12 is ejected by the second ejector element to the left out of the shrinkage segment 14, and is caught softly in the retainer 44 because of the spring force of the first ejector element 48.

Alternatively, the first ejector element can also remain inactive during the unclamping process, so that the tool 12 is ejected solely by the second ejector element 34 into the retainer 44 and caught therein.

What is claimed is:

1. Device for clamping tools in a clamping chuck having a shrinkage segment for clamping a tool with a shrinkage fit, said device comprising:
   a heating means for heating said shrinkage segment;
   a receiving means, arranged adjacent said shrinkage segment and in axial alignment therewith, for holding said tool prior to clamping within said shrinkage segment of said clamping chuck and for receiving said tool upon unclamping from said shrinkage segment; and
   biasing means for bracing said receiving means against said shrinkage segment
   and for shifting said tool axially from said receiving means into said shrinkage segment when said shrinkage segment has expanded enough to receive said tool.

2. Device according to claim 1, further comprising means for rotationally driving said clamping chuck together with said receiving means.

3. Device according to claim 2, wherein said means for rotationally driving said clamping chuck together with said receiving means includes a headstock with a clamping means for clamping said clamping chuck on one end thereof opposite said shrinkage segment, and a motor for rotationally driving said clamping means.

4. Device according to claim 3, wherein said receiving means includes a sleeve having a receiving bushing to receive and center said tool.

5. Device according to claim 2, wherein said biasing means includes a first ejector element for bracing a first end of said tool under spring force against said shrinkage segment.

6. Device according to claim 5, wherein said clamping chuck comprises a central bore, and the device further comprises a second ejector element disposed opposite said biasing means, said second ejector element passing through said central bore and bracing said tool under spring force on a second end thereof for shifting said tool from said clamping chuck into said receiving means when said shrinkage segment of said clamping chuck is heated enough by said heating means to release said tool.

7. Device according to claim 6, wherein said second ejector element has a spring force which is greater than the spring force of said first ejector element, and wherein in order to unclamp said tool from said clamping chuck, both ejector elements can be braced against said tool.

8. Device according to claim 1, wherein said shrinkage segment comprises an essentially cylindrical bore ending in a transition region adjacent a fastening segment provided on said clamping chuck which serves to fasten said clamping chuck to a machine tool.

9. Device according to claim 8, wherein said heating means comprises a gas burner, having a gas flame directed onto said transition region between said cylindrical bore and said fastening segment on the side of the said clamping chuck.

10. Device according to claim 9, further comprising means for improving heat transfer from said gas flame onto said transition region.

11. Device according to claim 10, wherein said means for improving heat transfer comprises a roughened surface in the transition region of the clamping chuck.

12. Device according to claim 11, wherein said roughened surface is sandblasted, corrugated, ribbed, knurled or toothed in the transition region.

13. Device according to claim 9, wherein said gas burner includes a burner head arranged so that a gas flame is directed onto said transition region of said clamping chuck at an angle of approximately 10° to 20°, with respect to the radial direction.

14. Device according to claim 2, wherein said means for rotationally driving said clamping chuck is configured for rotating said clamping chuck at approximately 200 to 500 rpm for clamping or unclamping said tool.

15. Device according to claim 2, wherein said means for rotationally driving said clamping chuck is configured for rotating said clamping chuck at approximately 300 to 400 rpm for clamping or unclamping said tool.

16. Device according to claim 9 wherein said clamping chuck is configured so that heating the transition region between said cylindrical bore and said fastening segment to approximately 150° to 250° C. enables clamping and unclamping said tool.

17. Device according to claim 9, wherein said clamping chuck is configured so that heating the transition region between said cylindrical bore and said fastening segment to approximately 180° to 200° C. enables clamping and unclamping said tool.

18. Device according to claim 1, wherein said heating means is coupled to a shutoff means for shutting off said heating means automatically when shifting of said tool from said receiving means into said shrinkage segment is completed.

19. Device according to claim 1, wherein said heating means is coupled to a shutoff means for shutting off said heating means automatically when shifting of said tool from said shrinkage segment into said receiving means is completed.

20. Device according to claim 4, wherein said sleeve is arranged so that it can be moved with respect to the headstock on a guide by means of a pneumatic or hydraulic cylinder.

21. Process for clamping a tool in a shrinkage segment of a clamping chuck in a shrinkage fit comprising the steps of holding said tool in axial alignment with said shrinkage segment; bracing said tool against said shrinkage segment with a biasing force while said shrinkage segment is heated until said shrinkage segment has expanded sufficiently so that said tool is shifted axially into said shrinkage segment under the action of the biasing force, to effect clamping of said tool in said shrinkage segment upon cooling thereof.

22. Process according to claim 21 further comprising the step of heating said tool retained in said shrinkage segment in a shrinkage fit while a force is exerted on said tool in the axial direction, until said shrinkage segment has expanded sufficiently to release said tool under the action of the axial force to effect unclamping of said tool.

23. Process according to claim 21 further comprising the step of rotating said clamping chuck and said tool during heating thereof.

24. Process according to claim 22 further comprising the step of rotating said clamping chuck and said tool during heating thereof.

* * * * *